United States Patent
Schmidt (10) Patent No.: US 7,607,821 B2
(45) Date of Patent: Oct. 27, 2009

(54) BAFFLE SECURED AT A DISTANCE FROM THE INNER WALL OF A GLASS-LINED CONTAINER BY MEANS OF A LOCAL CONNECTION

(75) Inventor: Rémy Schmidt, Offwiller (FR)

(73) Assignee: De Dietrich, Niederbronn les Bains (FR)

( * ) Notice: Subject to any disclaimer, the term of this patent is extended or adjusted under 35 U.S.C. 154(b) by 538 days.

(21) Appl. No.: 10/541,009

(22) PCT Filed: Dec. 17, 2003

(86) PCT No.: PCT/FR03/03772

§ 371 (c)(1),
(2), (4) Date: Jun. 28, 2005

(87) PCT Pub. No.: WO2004/073847

PCT Pub. Date: Sep. 2, 2004

(65) Prior Publication Data

US 2006/0163260 A1    Jul. 27, 2006

(30) Foreign Application Priority Data

Jan. 21, 2003   (FR) .................................. 03 00607

(51) Int. Cl.
*B01F 7/16* (2006.01)
*B01F 15/06* (2006.01)
*B01J 19/02* (2006.01)

(52) U.S. Cl. .................. 366/307; 366/147; 422/228

(58) Field of Classification Search ............. 366/64–66, 366/96–98, 262–266, 270, 302, 307, 147; 422/225–229

See application file for complete search history.

(56) References Cited

U.S. PATENT DOCUMENTS

| | | | | |
|---|---|---|---|---|
| 2,159,856 A | * | 5/1939 | MaClean | 366/307 |
| 3,130,015 A | * | 4/1964 | Monroe | 422/226 |
| 3,265,368 A | * | 8/1966 | Nocera | 366/306 |
| 3,334,870 A | * | 8/1967 | Diehl et al. | 366/306 |
| 3,675,902 A | * | 7/1972 | Marshall | 366/307 |
| 4,150,900 A | * | 4/1979 | Smith et al. | 366/302 |
| 4,155,657 A | * | 5/1979 | King et al. | 366/172.1 |
| 4,172,877 A | * | 10/1979 | Schwaig | 422/205 |
| 4,203,961 A | * | 5/1980 | Cowley | 423/478 |
| 4,244,531 A | * | 1/1981 | Szegvari | 241/172 |

(Continued)

FOREIGN PATENT DOCUMENTS

DE    3442294 A1  *  5/1986

(Continued)

*Primary Examiner*—Charles E Cooley
(74) *Attorney, Agent, or Firm*—Davis & Bujold, P.L.L.C.

(57) ABSTRACT

The baffle (14) is fixed at a distance from the internal wall (12) facing a container (1) to be enamelled, for example a chemical reactor and is held separated from the internal wall (12) by way of at least one local connection (15). The baffle may be solid or hollow and in the latter case can be in fluid connection with the closed space (13) between the external wall (11) and the internal wall of the container at the local connection. The invention also relates to a container comprising one or several baffles of the type. The invention is of use in the chemical industry and in particular to the producers and users of baffles.

23 Claims, 7 Drawing Sheets

U.S. PATENT DOCUMENTS

| | | | | |
|---|---|---|---|---|
| 4,276,262 A | * | 6/1981 | Cowley | 422/187 |
| 4,457,627 A | * | 7/1984 | Kirby et al. | 366/65 |
| 4,512,935 A | * | 4/1985 | Hilmersson et al. | 261/79.2 |
| 4,519,959 A | * | 5/1985 | Takeuchi et al. | 261/93 |
| 4,612,088 A | * | 9/1986 | Nardi | 162/235 |
| 4,667,730 A | * | 5/1987 | Zemp | 165/293 |
| 4,728,731 A | * | 3/1988 | Raehse et al. | 536/96 |
| 4,875,781 A | * | 10/1989 | Raska | 366/130 |
| 4,934,828 A | * | 6/1990 | Janssen | 366/307 |
| 5,102,229 A | * | 4/1992 | Wada et al. | 366/294 |
| 5,102,630 A | * | 4/1992 | Lee | 422/224 |
| 5,160,041 A | * | 11/1992 | Taniguchi et al. | 210/205 |
| 5,240,327 A | * | 8/1993 | Nyman et al. | 366/302 |
| 5,399,014 A | * | 3/1995 | Takata et al. | 366/262 |
| 5,472,278 A | * | 12/1995 | Kawaoka et al. | 366/262 |
| 5,582,799 A | * | 12/1996 | Amorese et al. | 422/118 |
| 5,632,962 A | * | 5/1997 | Baker et al. | 422/211 |
| 5,762,417 A | * | 6/1998 | Essen et al. | 366/264 |
| 5,782,556 A | * | 7/1998 | Chu | 366/155.1 |
| 6,059,448 A | * | 5/2000 | Reeder et al. | 366/306 |
| 6,250,796 B1 | * | 6/2001 | Huang | 366/270 |
| 6,508,583 B1 | * | 1/2003 | Shankwitz et al. | 366/196 |
| 6,612,733 B2 | * | 9/2003 | Schmidt et al. | 366/310 |
| 2003/0007417 A1 | * | 1/2003 | Miyata et al. | 366/247 |
| 2006/0176771 A1 | * | 8/2006 | Adams | 366/270 |
| 2006/0233043 A1 | * | 10/2006 | Himmelsbach | 366/147 |

FOREIGN PATENT DOCUMENTS

| | | | |
|---|---|---|---|
| DE | 197 23 977 A1 | | 12/1998 |
| DE | 19723976 A1 | * | 12/1998 |
| DE | 102006020813 B3 | * | 10/2007 |
| EP | 12410 A1 | * | 6/1980 |
| EP | 402317 A1 | * | 12/1990 |
| EP | 983789 A1 | * | 3/2000 |
| EP | 1 172 138 A1 | | 1/2002 |
| EP | 1 208 905 A2 | | 5/2002 |
| EP | 1208905 A2 | * | 5/2002 |
| EP | 1258289 A2 | * | 11/2002 |
| FR | 2888132 A1 | * | 1/2007 |
| GB | 2068247 A | * | 8/1981 |
| JP | 03229629 A | * | 10/1991 |
| JP | 09316047 A | * | 12/1997 |
| JP | 2004107252 A | * | 4/2004 |
| WO | WO 2004073847 A1 | * | 9/2004 |

* cited by examiner

-- Prior Art --

BAFFLE SECURED AT A DISTANCE FROM THE INNER WALL OF A GLASS-LINED CONTAINER BY MEANS OF A LOCAL CONNECTION

This application is a national stage completion of PCT/FR03103772 filed Dec. 17, 2003 which claims priority from French Application Ser. No. 03/00607 filed Jan. 21, 2003.

FIELD OF THE INVENTION

The present invention relates to a baffle, secured preferably by welding, to the wall of a glass-lined or vitrified container, by means of a local connection.

BACKGROUND OF THE INVENTION

In the chemical industry, it is sometimes necessary to use or store particularly acidic reagents or products or corrosives that make it impossible to use traditional containers or tanks whose steel walls would be attacked and destroyed.

A solution consists in using in this case a reactor tank or container or other containers whose internal wall is glass-lined. This inert and very resistant coating ensures protection of the tank or container against the aggressive attack of the contained material.

However, in order to avoid any risk of deterioration of the container and any risk of leakage that would be dangerous for people, the material, the environment, and the integrity of this glass-lined protective coating must be ensured at all times.

The integrity of this glass-lined protective coating depends closely on the internal geometry of the container and its interior elements. Thus, angular zones, which are very difficult to enamel, must be avoided. On the contrary, smooth and curved surfaces are preferred.

A sudden variation in temperature, either on the glass-lined or steel side can lead to the destruction of the glass-lined coating by thermal shock. The most dangerous thermal shocks are caused by projections of cold materials onto a hot glass-lined surface.

Moreover, during the process of glass-lining, treated surfaces generally undergo heat treatment requiring heating to a temperature of 700 to 850° C., which induces significant thermal expansion. Such thermal expansion causes tension which in turn can damage or deteriorate the protective glass-lining.

In addition, it is often necessary in the chemical industry to agitate the material in the container. This agitation is generally carried out by means of an agitator and it can be associated with one or more baffles.

Conventionally, the tanks or containers equipped with an impeller, which is inserted through a nozzle in the tank or container, comprise one or more baffles. More rarely, the baffles can be secured over their entire length on the internal surface of the tank or container.

A baffle is a device that allows better agitation, in particular by creating additional turbulence in the agitated medium and by preventing the formation of a swirl or vortex.

In the case of devices welded inside the tank or container to be glass-lined, the extent of the stresses is increased due to thermal expansion if these devices are welded along a critical length or along their entire periphery against the internal wall of the tank or container.

SUMMARY OF THE INVENTION

The goal of the invention is to provide a baffle secured to the internal surface of a glass-lined container or tank so that the glass-lining phase can be conducted in an easy, effective, and reliable way and that the coating layer is of a uniform, solid and durable nature.

According to prior art described for example in U.S. Pat. No. 4,172,877 in the name of Robert H. SCHWAIG, a baffle of low depth can be achieved by embossing the internal wall of the container or by welding a part which is brought back against this internal wall. This baffle is intended to be hollow and connected to a possible double walled construction of the container to, for example, allow the circulation of a heating or cooling liquid in the body of the baffle.

The formation of the baffle by embossing the inner wall makes it difficult to ensure an easy and reliable glass-lining and does not allow the formation of a complex shape for the baffle. Moreover, this manufacturing process weakens the deformed part by making it thinner and it does not allow production of a baffle having a significant surface without reducing its rigidity in a critical way.

According to the second embodiment of the baffle of SCHWAIG patent, the baffle is made of a metal plate whose edges are folded up and welded against the internal wall of the container onto the entire periphery or height of the baffle.

However, the present inventors noted that it is difficult to glass-line such welding, due to its considerable length, extending along its entire periphery or height.

Indeed, the mechanical tensions caused by the thermal expansion of the baffle are increased by the considerable length of this embodiment and can involve a serious deterioration of the glass-lined coating.

Moreover, with a baffle welded along its entire periphery or height, the control of the industrial manufacturing process is very difficult. The results are random and the process is not reproducible at industrial production speeds.

For these various reasons, the solutions disclosed in U.S. Pat. No. 4,172,877 are not satisfactory.

Thus, the goal of this invention is to provide a baffle of any size or form, which can be secured to the internal surface of a container, so that the unit can then be glass-lined in a simple, effective, reliable and durable way.

Preferentially, according to the present invention, the baffle can be solid or hollow and in communication with the possible space created between the double wall of the container.

The word container means any vessel intended to contain liquids, gases, solid, pasty, viscous or powdery materials or mixtures of these, which can be equipped with a baffle such as: vessel, tank or container, cistern, column, drier, exchanger or other.

Only glass-lined containers will be dealt with in relation with the present invention.

The most frequent use of baffles being related with reaction containers, this latter term will be used to indicate the container, even if it can be applied to all other types of container.

To solve the technical manufacturing problem, the object of this invention consists in conceiving a baffle secured at a distance to the inner adjacent wall of the container and secured to this wall by means of a local connection.

The baffle then remains almost insensitive to any expansion of the remainder of the container because differing expansions of the baffle and the wall are allowed.

Thus, in the present invention, instead of securing the baffle over its entire length to the inner wall of the container, a partial securing by means of one or several connections is preferred. Preferentially, the baffle is secured locally by means of a single connection.

By local connection, it must be understood a connection whose extent is limited, i.e. a connection not extending over the overall height of the baffle and whose width is thus less than the length of the baffle.

In this way, the major part of the baffle remains free and can be deformed, and expand freely without influencing nor being influenced by the remainder of the container in particular during the thermal cycles encountered during enameling.

Moreover, in the preferred case where the fabrication is achieved by welding, the weld bead has a reduced length, which avoids the above-mentioned disadvantages of the prior art.

Lastly, according to the present invention the baffle may either be full or hollow.

When the baffle is hollow, its interior space can then be designed to include a connecting fluid path through its local connection, with a circulation system for a fluid, to provide a heating or cooling function, for the container, this system for, example consisting of a double walled construction, a serpentine, a half-shell or other such forms. A means can be provided for the circulation of the fluid in the baffle.

For these many reasons, the device of this invention satisfies all the above-mentioned objectives without presenting any of the disadvantages. It thus represents a completely new ideal device that allows provision of one or more baffles in an glass-lined container while ensuring provision of an glass-lined coating for the unit in a simple, effective, reliable and durable way.

From its design, except at its local connection, there is a space located between the body of the baffle and the interior wall of the container to which it is welded. This space allows a free movement of the material present in the container between the baffle and the interior wall of the container, except at the local connection of the baffle. The space also considerably facilitates the ease of subsequent cleaning of the container.

This space also eliminates the disadvantage usually encountered with containers equipped with a baffle such as that of U.S. Pat. No. 4,172,877 in which material accumulates in the angle formed between the side of the baffle and the interior surface of the container to which it is welded. This accumulation, which usually forms on the side opposite the directional flow of the agitation, is avoided in the present invention, by the permanent flow permitted between the container inner wall and the baffle.

Lastly, from its particularly advantageous form, the baffle according to this invention increases the hydraulic performance of the baffle and reduces mixing time and homogenization, which enables time saving and reduces industrial costs considerably.

BRIEF DESCRIPTION OF THE DRAWINGS

Other characteristics and advantages of the invention will be apparent from the following description, which refers to the accompanying drawings, in which.

DETAILED DESCRIPTION OF THE INVENTION

Figure 1:
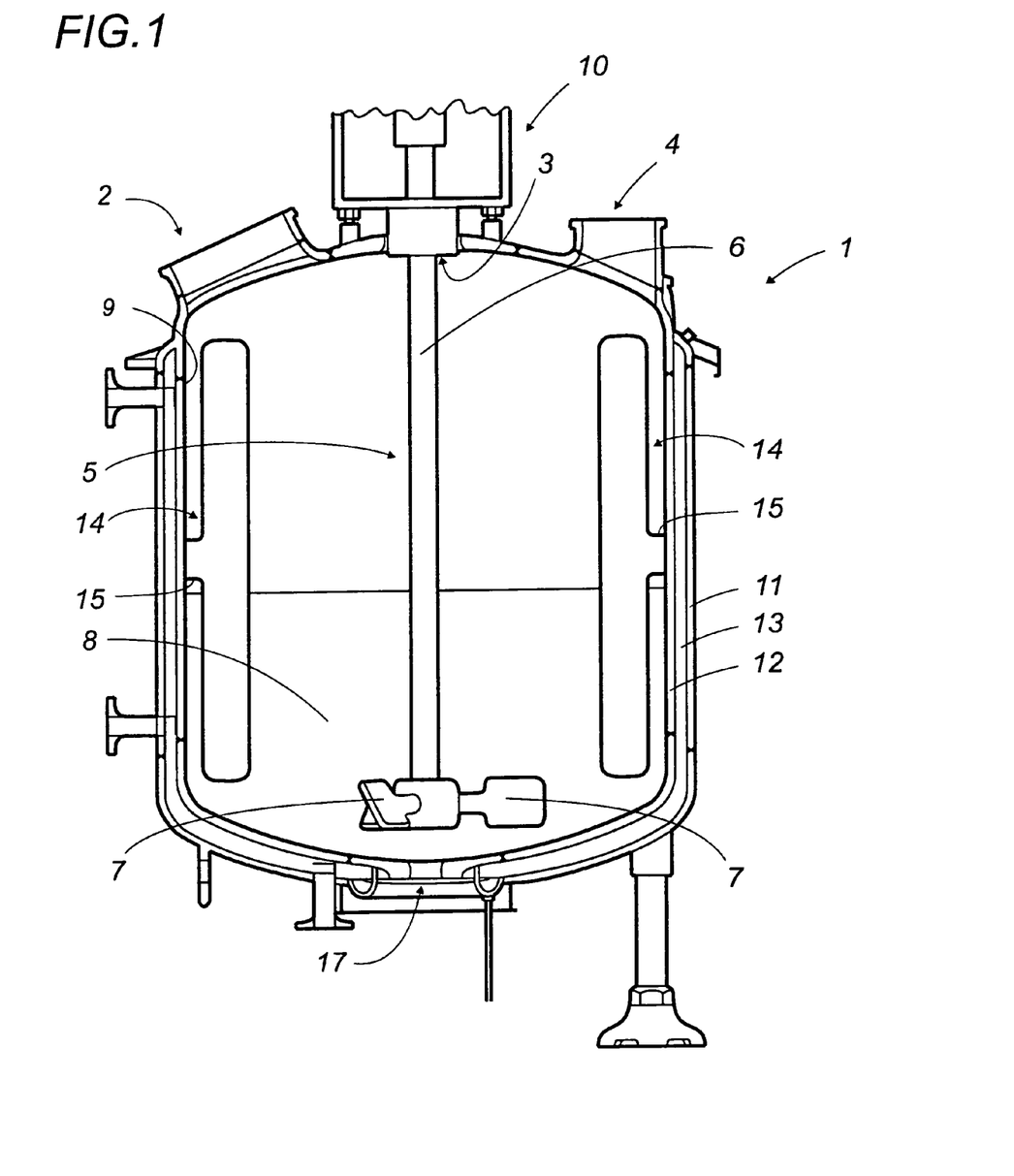
FIG. 1 is a vertical cross-sectional view of a tank or container with a double envelope provided with an impeller and two solid baffles opposite each other, according to the invention.

FIG. 1 represents a chemical reactor tank or container 1 fitted with three integral top openings 2, 3 and 4 through which the various reagents, solvents and catalysts can be introduced or various instruments or accessories (impeller, probes, emptying tubes and or devices, etc.) can be passed through and into the tank or container 1.

Tank or container 1 is provided with a mechanical impeller 5 whose stem 6 crosses the central opening 3 and extends towards the lower part of the tank or container. Stem 6 ends for example in a hub fitted with three tilted blades 7, to agitate the contents 8 of tank or container 1 when the stem 6 is rotated by a driving mechanism 10 positioned outside the tank or container.

In order to resist the aggressions of a highly potent reacting medium forming the content 8 of tank or container 1, the internal surface of the tank or container may be completely coated with a glass-lined protective coating 9 also called vitrified coating. In the same way, all surfaces that may be brought in contact with the contents 8 must also be glass-lined. It is obviously the same for stem 6 and blades 7 of impeller 5.

A second wall 11 surrounds the internal wall 12 of tank or container 1, these walls 12 and 11 being at a specific and constant distance from each other to create between them an enclosed space 13. This space 13 is anticipated for the provision of a hot or cold fluid medium to facilitate the control of the internal temperature of the tank or container according to the well-known principle of the double walled tank or container.

In this figure, tank or container 1 comprises several baffles 14 independent of the internal wall 12 of the tank or container 1 being secured at a distance from the internal wall 12 and welded onto this wall 12 with a local connection 15 whose width is less than the length of the baffle, according to the invention.

Lastly, at its lowest part, the tank or container 1 shows an opening 17 which may be used as an opening for draining the contents 8.

In this first embodiment, the baffles 14 are solid. Their local connections 15 are vertically positioned at the approximate midpoint of each baffle 14. The baffles are shaped into a simple general form, similar to a board substantially vertical and perpendicular to the internal wall 12 of the tank or container 1, whose edges and angles are rounded.

Figure 2:
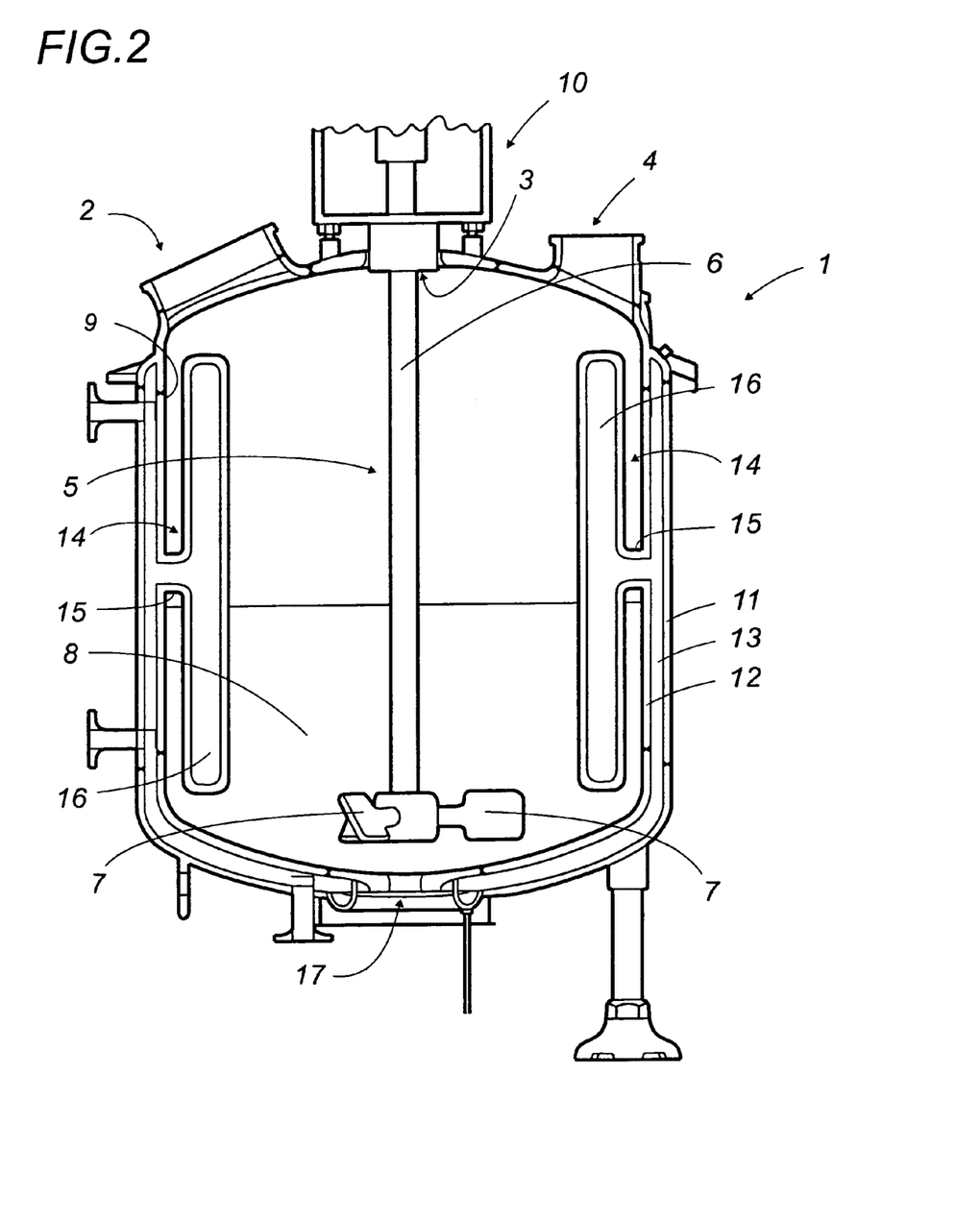
FIG. 2 is a vertical cross-sectional view of a tank or container with a double envelope provided with an impeller and two hollow baffles opposite each other and provided with a connecting fluid path to the double envelope of the tank or container, according to the invention.

In a second embodiment shown in FIG. 2, a tank or container 1 similar to that of FIG. 1 is equipped with several baffles 14 being secured at a distance from the internal wall 12 of the tank or container 1 and welded against this wall 12 by the transitional local connection 15.

According to this embodiment, the baffles 14 of the invention are hollow and define an interior hollow space 16 which can possibly and additionally be arranged to be provided with a connecting fluid path to the enclosed space 13 between the external wall 11 and the internal wall 12 of the double walled construction of the tank or container 1.

In this way, a fluid, to provide a heating or cooling function, can be circulated in the double walled construction of tank or container 1 and can additionally circulate in the baffles 14, which considerably improves the heat exchange characteristics of the unit.

An equivalent connection to the interior hollow space 16 for the heating or cooling fluid can be provided in a similar way when the tank or container is equipped with a hemi-coil, half-shells or with any other similar system.

In the two preceding embodiments represented in FIGS. 1 and 2, the baffles have a simple and traditional general form. The baffle according to the invention, by its advantageous design, can beneficially adopt more complex and varied general forms. It can thus adapt to the stresses and the particular design features of each practical situation considered and confer additional advantages.

Figure 3:
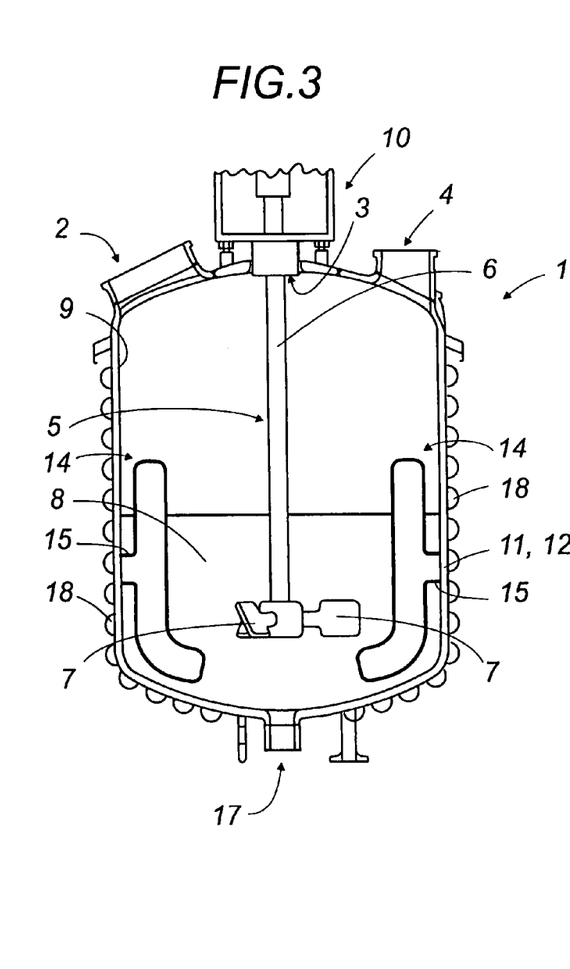
FIG. 3 is a vertical cross-sectional view of a tank or container fitted with an external serpentine and provided with an impeller and two baffles opposite each other, according to an embodiment of the invention.

Thus, the baffle according to the invention can for example be curved towards its lowest end. It can thus adopt a "hockey stick" shape, as represented in FIG. 3 where it is shown fitted to a tank or container with a hemi-coil or half-shell. Such a general shape for the baffle makes it possible for example to establish a counter-agitation in the contents of the tank or container.

Figure 4:
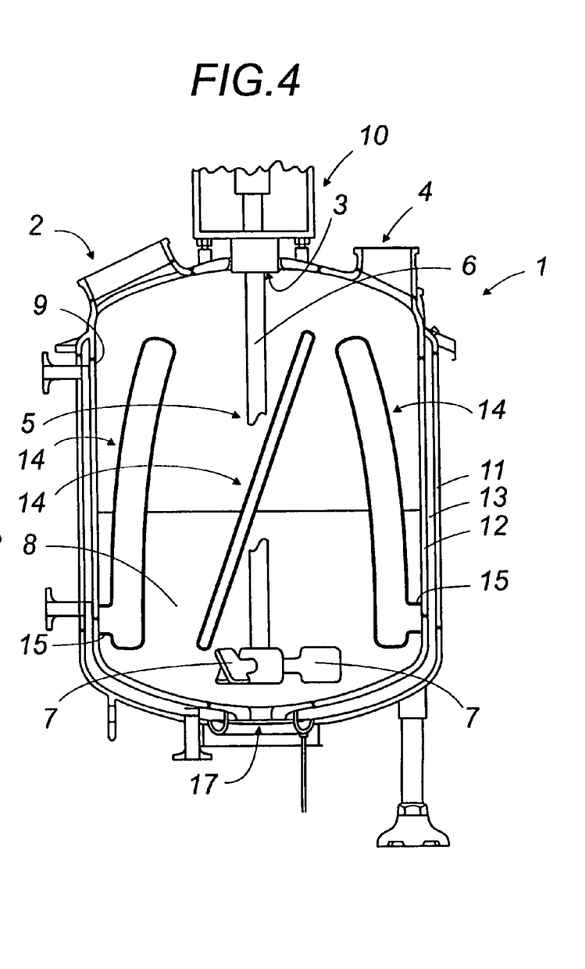
FIG. 4 is a vertical cross-sectional view of a tank or container provided with a double walled construction provided with an impeller and two pairs of baffles opposite each other, according to another embodiment of the invention.

Obviously, the baffle according to the invention can be curved, convex or arched at another vertical position and for example slightly higher as represented in FIG. 4.

Moreover, local connection 15 is not necessarily located in the vertical middle of the baffle, but can be positioned at an unspecified height. Thus, for example in the embodiment of FIG. 4, it can be located near the lower edge of the baffle 14.

In the case of the alternate embodiment represented in this FIG. 4, one can also note that the baffles according to the invention can also be secured tilted, i.e. positioned relative to the wall of the tank or container forming an unspecified angle with respect to the vertical.

Figure 5:
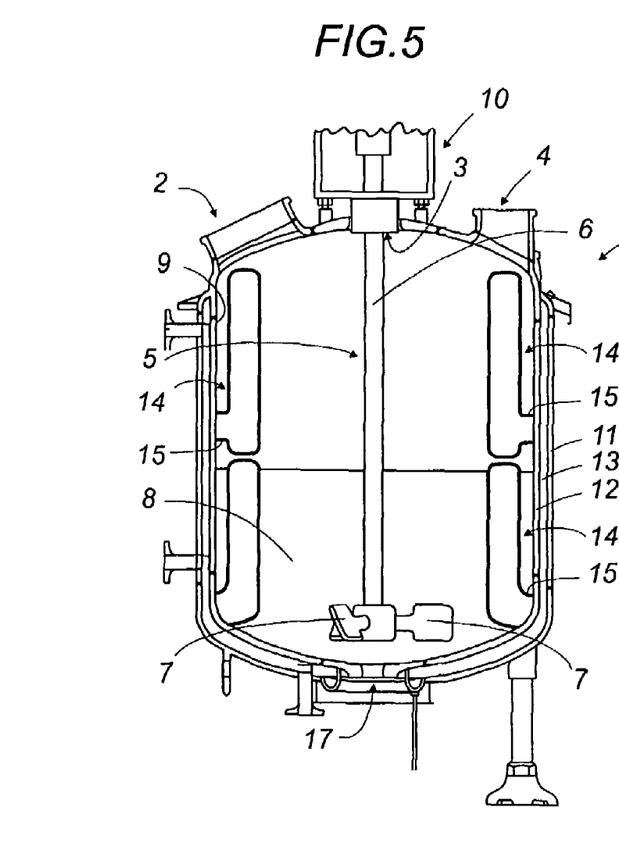
FIG. 5 is a vertical cross-sectional view of a tank or container with a double walled construction provided with an impeller and two pairs of baffles opposite each other with low local fixation, according to another embodiment of the invention.
Figure 6:
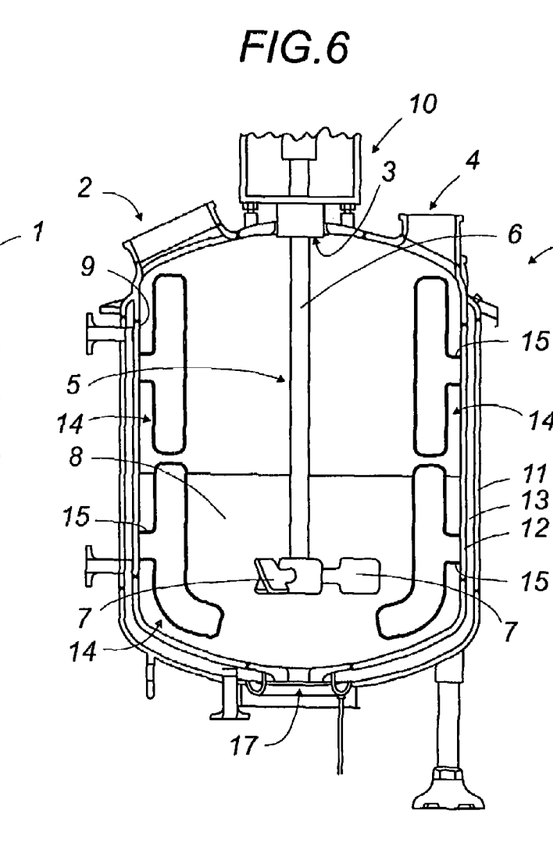
FIG. 6 is a vertical cross-sectional view of a tank or container with a double walled construction provided with an impeller and two pairs of baffles opposite each other with approximately central fixation, according to another embodiment of the invention.

As represented in FIGS. 5 and 6, it is also possible to combine baffles into pairs to obtain the equivalent of one baffle having a significantly greater length. One can observe in these figures that the baffles forming each pair are not necessarily identical. One can obviously plan to combine baffles in any number greater than two.

The use of several combined baffle shapes in pairs or more, makes it possible for example to reduce manufacturing costs by utilizing common shapes in a flexible way to adapt to various tanks or containers.

Moreover, if the baffles can adopt various general forms, they can also be different in height, width and thickness to facilitate adaptation and conformation to the requirements of any tank or container.

They can also exhibit various sectional forms to create the required mechanical effects for the fluids involved.

FIGS. 7 to 15 show some examples of these sectional forms which can be used for the baffles 14. These sectional forms can be used for solid baffles as well as hollow baffles.

Figure 7:
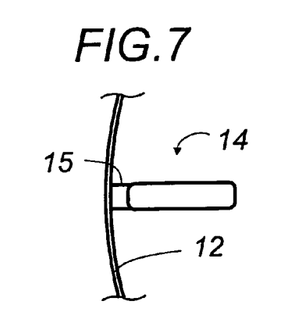
FIGS. 7 to 15 are partial horizontal cross-sectional views of part of a tank or container provided with a baffle, showing the various forms that the baffle section may take, according to the invention.

FIG. 7 represents a baffle 14 with a traditional sectional shape, a substantially rectangular type with rounded edges.

Figure 8:
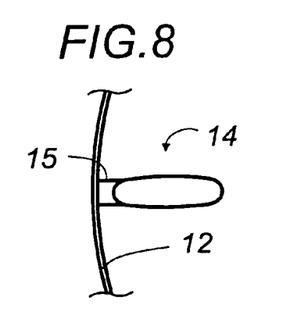
Figure 9:
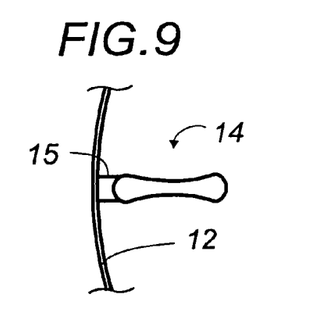

FIG. 8 represents a baffle 14 having a section with convex sides, while on FIG. 9 these same convex sides are concave.

Figure 10:
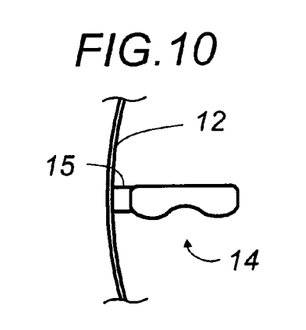

FIG. 10 represents a baffle 14, the section of which exhibits undulations on one of the sides. In the same way, one can consider that the section of baffle 14 can exhibit an unspecified number of undulations on one or more of its sides.

Figure 11:
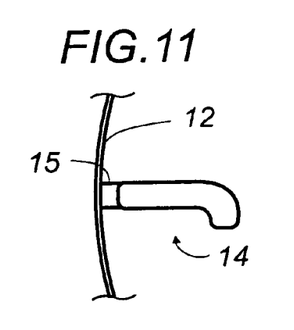

FIG. 11 represents a section of baffle 14 with a curved side end.

Figure 12:
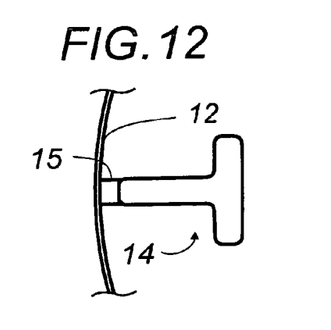

FIG. 12 represents a baffle 14 having a "T" shaped section.

Figure 13:
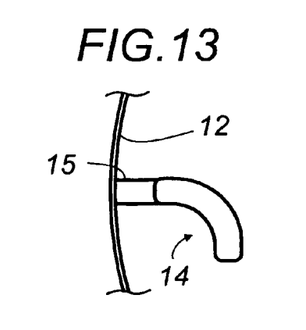

FIG. 13 represents a baffle 14 whose section is in the form of a quarter of a circle or quadrant.

Figure 14:
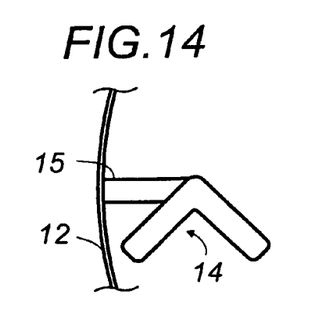

FIG. 14 represents a baffle 14 having a "V" shaped section.

Figure 15:
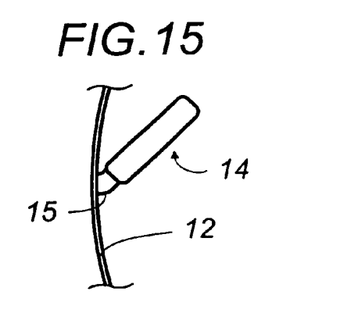

Lastly, the baffles 14 can also be secured in a non-perpendicular way to the wall of the tank or container as represented in FIG. 15.

FIGS. 7 to 15 are given only by way of examples of sectional forms and those skilled in the art will easily be able to consider other forms for the baffle section, by varying its dimensions, its concavity or its convexity, its orientation, its slope, its position and angle of fixation, etc.

As already mentioned above, a container can be provided with one or several baffles 14. According to a preferential embodiment of the invention, a container can be equipped with several baffles 14 distributed regularly and/or laid out appreciably along a theoretical curve, for example in the shape of a helix, located on the internal wall 12 of a tank or container 1.

Figure 16:
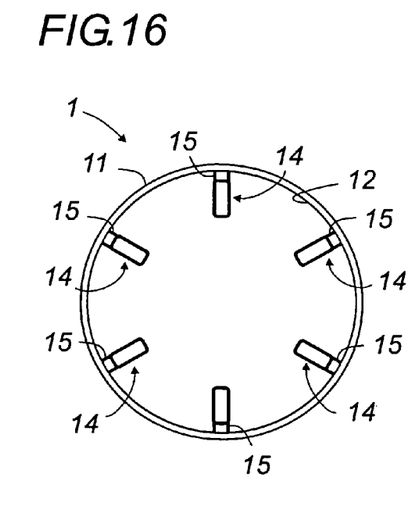
FIG. 16 is a horizontal cross-sectional view of an tank or container provided with six baffles, according to an embodiment of the invention.

FIG. 16 represents a horizontal cross-sectional view of a horizontal cut through a tank or container 1 provided with six baffles 14 having a traditional sectional form of appreciably rectangular shape with rounded edges, baffles 14 being distributed evenly on the internal wall 12 of the tank or container, i.e. with a relative angular spacing appreciably constant, for example approximately 60° in the case shown in this figure.

Figure 17:
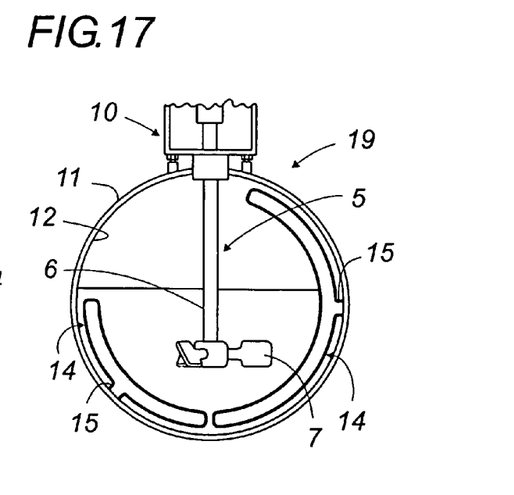
FIG. 17 is a vertical cross-sectional view of a horizontal tank or container provided with two baffles, according to an embodiment of the invention.

FIG. 17 represents a transverse cross-sectional view of a horizontal tank or container 19 provided with two baffles of different forms. The first one is in the form of a quadrant or quarter of a circle while the second is in the shape of half a circle.

Figure 18:
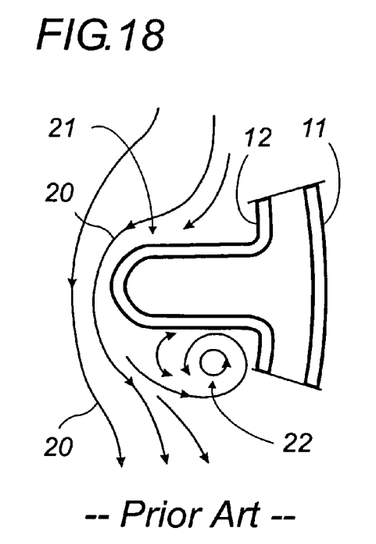
FIG. 18 is a diagrammatic horizontal cross-sectional view of the fluid flow past and around a baffle, according to the prior art of U.S. Pat. No. 4,172,877.

FIG. 18 represents a diagrammatic cross-sectional view or horizontal cut to show the flow of fluid 20 at the level of a baffle 21 according to the prior art which is positioned against the internal wall 12 of tank or container 1 and is secured to this wall along all its height. With such a baffle 21, an accumulation of material in the form of a deposit is possible because of a stagnated fluid flow at a dead zone 22 that is not sufficiently agitated by the fluid flow.

Figure 19:
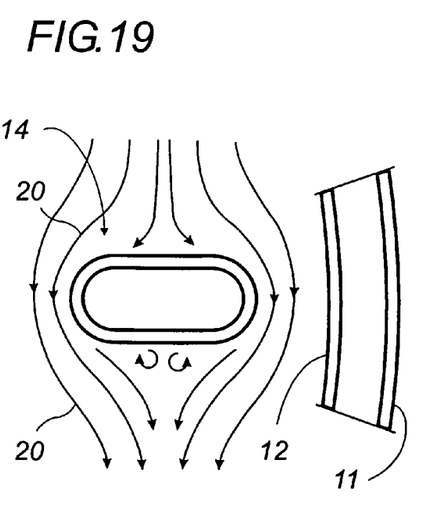
FIG. 19 is a diagrammatic horizontal cross-sectional view of the fluid flow past and around a baffle, according to the invention.

By way of comparison, FIG. 19 represents a diagrammatic cross-sectional view or horizontal cut to show the flow of fluid 20 at the level of a baffle 14 according to the invention, where the baffle 14 is not secured to the wall of the tank or container. Advantageously, any accumulation of material in the form of deposit is avoided because the circulation of fluid 20 on both sides of the baffle is sufficiently agitated.

According to another embodiment not represented, a tank or container 1 may be equipped with several baffles 14 laid out along a theoretical curve forming a helix on the internal wall 12 of the tank or container or presenting themselves appreciably in the shape of a helix.

Figure 20:
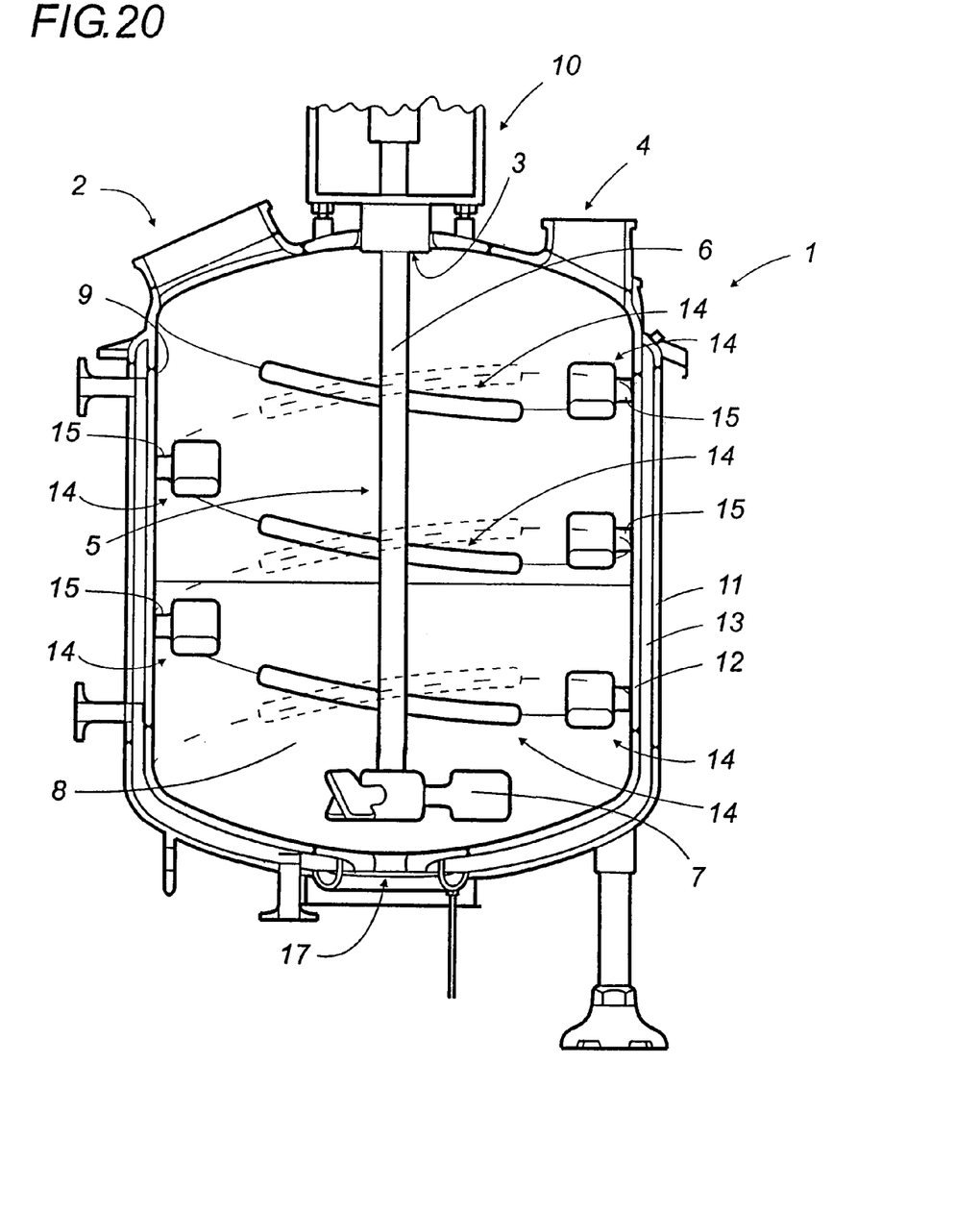
FIG. 20 is a vertical cross-sectional view of a tank or container with a double jacket provided with an impeller and baffles appreciably arranged along a helix relative to the internal wall of the container.

In this case, as seen in FIG. 20, the baffles 14 can follow the general orientation of a helix or can be positioned differently whilst their relative positioning continues and follows the basic shape of a helix.

One can also consider that the baffles 14 are laid out substantially along a theoretical curve of a different type or along several different curves.

Lastly, it can additionally be planned to use several local connections to secure the baffle to the internal wall of the container when necessary for strength or other reasons.

The baffle device according to the invention is particularly well adapted to be used on the inner wall of a tank or container as represented in the figures. However, it must be well understood that its use is not limited to this application.

This baffle device can thus be secured against the wall of an unspecified container, glass-lined or not, with a single or double wall construction, with a serpentine surrounding the internal wall or not, and comprising an unspecified number of openings for whatever purposes or means of agitation.

In the same way, the baffle according to the invention is not inevitably installed within chemical tanks or containers, but can be used on any type of container for which it is useful to accomplish effective agitation without dead zones.

Obviously, the number, the general form, the sectional form, the slope, the orientation and the provision of the various baffles according to the invention represented in the figures are given here only as exemplary representations and are to be considered in no circumstances as restrictive.

Many variations can be imagined for the baffle according to the present invention without exceeding its scope. These variations will be obvious for those skilled in the art, who will be able in particular to consider other numbers, general forms, sectional forms, slopes, orientations and/or provisions for the baffles without exceeding the scope of the claims.

The invention claimed is:

1. A baffle secured to a glass-lined internal wall of a container, which is capable of being equipped with a system of circulation of thermal fluid, the baffle being secured to and held at a distance from an adjacent internal wall (12) of the container (1) and relative to the adjacent internal wall (12) and locally with the adjacent internal wall (12) by only a single local connection (15) whose greatest dimension is less than a length of the baffle, and the baffle and the local connection have only rounded edges and angles, and an external surface of the baffle and an external surface of the local connection are glass-lined forming a group of glass-lined surfaces with an internal lateral surface of the container, and the single local connection (15) enables the baffle to be substantially insensitive to expansion of a remainder of the container; and the local connection (15) is connected to the baffle (14) at a location between opposed ends of the baffle.

2. The baffle according to claim 1, wherein one end of each said local connection (15) is welded to the supported baffle (14) and an opposite end of each said local connection (15) is welded to the internal surface of the container and an entire internal surface of the container, including all exposes surfaces of each said local connection (15) and the supported baffle (14), are completely glass lined.

3. The baffle according to claim 2, wherein the baffle is a hollow body.

4. The baffle according to claim 2, wherein a hollow interior space (16) of the baffle (14) has a connecting fluid path, via the local connection (15), with the fluid of a heating or cooling system of the container for circulation of fluid.

5. The baffle according to claim 1, wherein the baffle is a hollow body.

6. The baffle according to claim 5, wherein a hollow interior space (16) of the baffle (14) has a connecting fluid path, via the local connection (15), with the fluid of a heating or cooling system of the container for circulation of fluid.

7. The baffle according to claim 1, wherein the local connection (15) is located near a lower edge or a upper edge of the baffle (14).

8. The baffle according to claim 1, wherein a body of the baffle is substantially planar, is substantially vertical and perpendicular to the internal wall (12) of the container (1), and only has rounded edges and angles.

9. The baffle according to claim 1, wherein a body of the baffle takes the general shape of a "hockey stick".

10. The baffle according to claim 1, wherein a body of the baffle is curved, at one or more of a vertically higher or lower part and on a side edge.

11. The baffle according to claim 1, wherein the form of a cross section of a body of the baffle is mainly rectangular and has rounded edges.

12. The baffle according to claim 1, wherein a body of the baffle exhibits one of concave or convex sides.

13. The baffle according to claim 1, wherein a form of a section presents at least an undulation on one of the sides of the baffle.

14. The baffle according to claim 1, wherein a body of the baffle is secured to the internal wall in an appreciably tilted orientation compared to a longitudinal axis of the container.

15. The baffle according to claim 1, wherein the baffle is secured in a skewed orientation relative to the internal wall (12) of the container (1).

16. The baffle according to claim 15, wherein an end of a body of the baffle is close to the adjacent internal wall and in that its opposite end is further away from the adjacent internal wall.

17. The baffle according to claim 1, wherein a hollow interior space (16) of the baffle (14) has a connecting fluid path, via the local connection (15), with the fluid of a heating or cooling system of the container for circulation of fluid.

18. A baffle secured to a glass-lined internal wall of a container, which is capable of being equipped with a system of circulation of thermal fluid, the baffle being secured to and held at a distance from an adjacent internal wall (12) of the container (1) and relative to the adjacent internal wall (12) and locally with the adjacent internal wall (12) by only a single local connection (15) whose greatest dimension is less than a length of the baffle, and the baffle and the local connection have only rounded edges and angles, and an external surface of the baffle and an external surface of the local connection are glass-lined forming a group of glass-lined surfaces with an internal lateral surface of the container, and the single local connection (15) enables the baffle to be substantially insensitive to expansion of a remainder of the container; and the local connection (15) is connected to the baffle (14) at substantially a middle portion thereof.

19. A reaction container comprising at least a baffle secured to a glass-lined internal wall of the container, which is capable of being equipped with a thermal fluid circulation system, the baffle being attached or secured to and held at a distance from an adjacent internal wall (12) of the container (1) and relative to the adjacent internal wall (12) and locally with the adjacent internal wall (12) only by a single local connection (15) whose greatest dimension is less than a length of the baffle, the local connection (15) is connected to the baffle (14) at a location between opposed ends of the baffle and the baffle and the local connection only having rounded edges and angles, an external surface of the baffle and an external surface of the local connection are glass-lined, and the external surface of the baffle, the external surface of the local connection and the internal surface of the container form an assembled group of completely glass-lined parts which are assembled together with one another.

20. The container according to claim 19, wherein the container includes several baffles (14) distributed about an interior of the container, and one end of each said local connection (15) is welded to the supported baffle (14) and an opposite end of each said local connection (15) is welded to the internal surface of the container and an entire internal surface of the container, including all exposes surfaces of each said local connection (15) and the supported baffle (14) are completely glass lined.

21. The container according to the claim 19, wherein the container includes several baffles (14) laid out appreciably along a theoretical curve relative to the internal wall (12) of the container (1).

22. The container according to claim 21, wherein the theoretical curve is a helix.

23. The container according to claim 19, wherein each local connection (15) is located near one of a first end and a second end of a respective baffle (14).

* * * * *